United States Patent [19]

Juday et al.

[11] Patent Number: 5,067,019

[45] Date of Patent: Nov. 19, 1991

[54] PROGRAMMABLE REMAPPER FOR IMAGE PROCESSING

[75] Inventors: Richard D. Juday, Houston; Jeffrey B. Sampsell, Plano, both of Tex.

[73] Assignee: The United States of America as represented by the Administrator of the National Aeronautics and Space Administration, Washington, D.C.

[21] Appl. No.: 331,551

[22] Filed: Mar. 31, 1989

[51] Int. Cl.$^5$ ............................................. H04N 5/262
[52] U.S. Cl. ..................................... 358/160; 358/22; 358/183
[58] Field of Search .................. 358/21 R, 22, 30, 94, 358/160, 183, 180; 340/723, 728, 729, 731, 799; 364/518, 520, 521; 382/44, 45, 46, 47

[56] References Cited

U.S. PATENT DOCUMENTS

| | | |
|---|---|---|
| 3,106,699 | 10/1963 | Kamentsky . |
| 3,849,760 | 11/1974 | Endou et al. . |
| 3,976,982 | 8/1976 | Eiselen . |
| 4,267,573 | 5/1981 | Chaikin et al. ...................... 364/515 |
| 4,302,776 | 11/1981 | Taylor et al. ........................ 358/160 |
| 4,334,245 | 6/1982 | Michael ................................ 358/183 |
| 4,415,928 | 11/1983 | Strolle et al. ........................ 358/140 |
| 4,471,349 | 9/1984 | Strolle ................................. 340/727 |
| 4,528,693 | 7/1985 | Pearson et al. ....................... 382/47 |
| 4,602,285 | 7/1986 | Beaulier et al. ..................... 358/160 |
| 4,606,066 | 8/1986 | Hata et al. ............................. 382/41 |
| 4,631,750 | 12/1986 | Gabriel et al. ........................ 382/41 |
| 4,682,160 | 7/1987 | Beckwith, Jr. et al. ............. 340/729 |
| 4,751,660 | 5/1988 | Hedley .................................. 382/44 |
| 4,757,384 | 7/1988 | Nonweiler et al. .................. 358/160 |
| 4,827,432 | 5/1989 | Kasano ................................. 358/160 |

Primary Examiner—John W. Shepperd
Assistant Examiner—Michael D. Parker
Attorney, Agent, or Firm—Hardie R. Barr; Harold W. Adams; Edward K. Fein

[57] ABSTRACT

A video-rate coordinate remapper includes a memory for storing a plurality of transformations on look-up tables for remapping input images from one coordinate system to another. Such transformations are operator selectable. The remapper includes a collective processor by which certain input pixels of an input image are transformed to a portion of the output image in a many-to-one relationship. The remapper includes an interpolative processor by which the remaining input pixels of the input image are transformed to another portion of the output image in a one-to-many relationship. The invention includes certain specific transforms for creating output images useful for certain defects of visually impaired people. The invention also includes circuitry for shifting input pixels and circuitry for scrolling the output matrix.

16 Claims, 10 Drawing Sheets

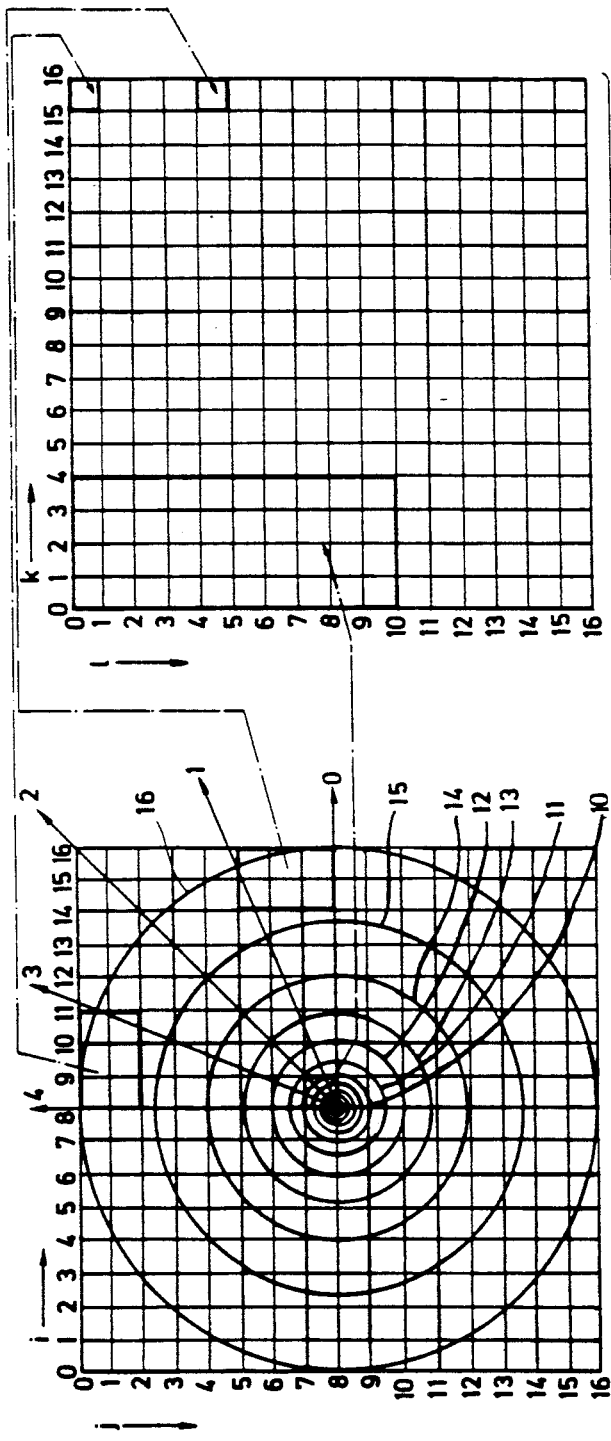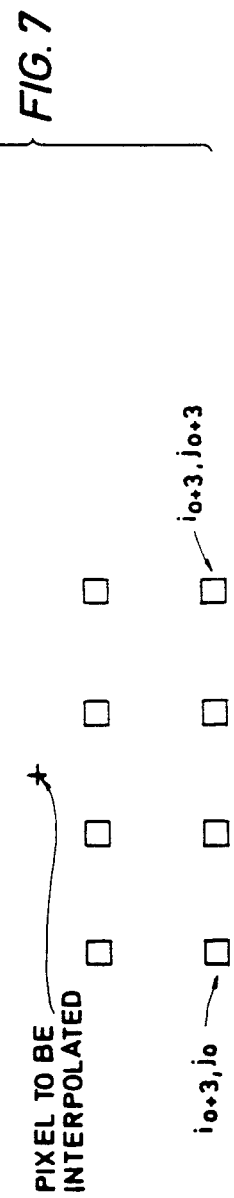
FIG. 6
FIG. 7

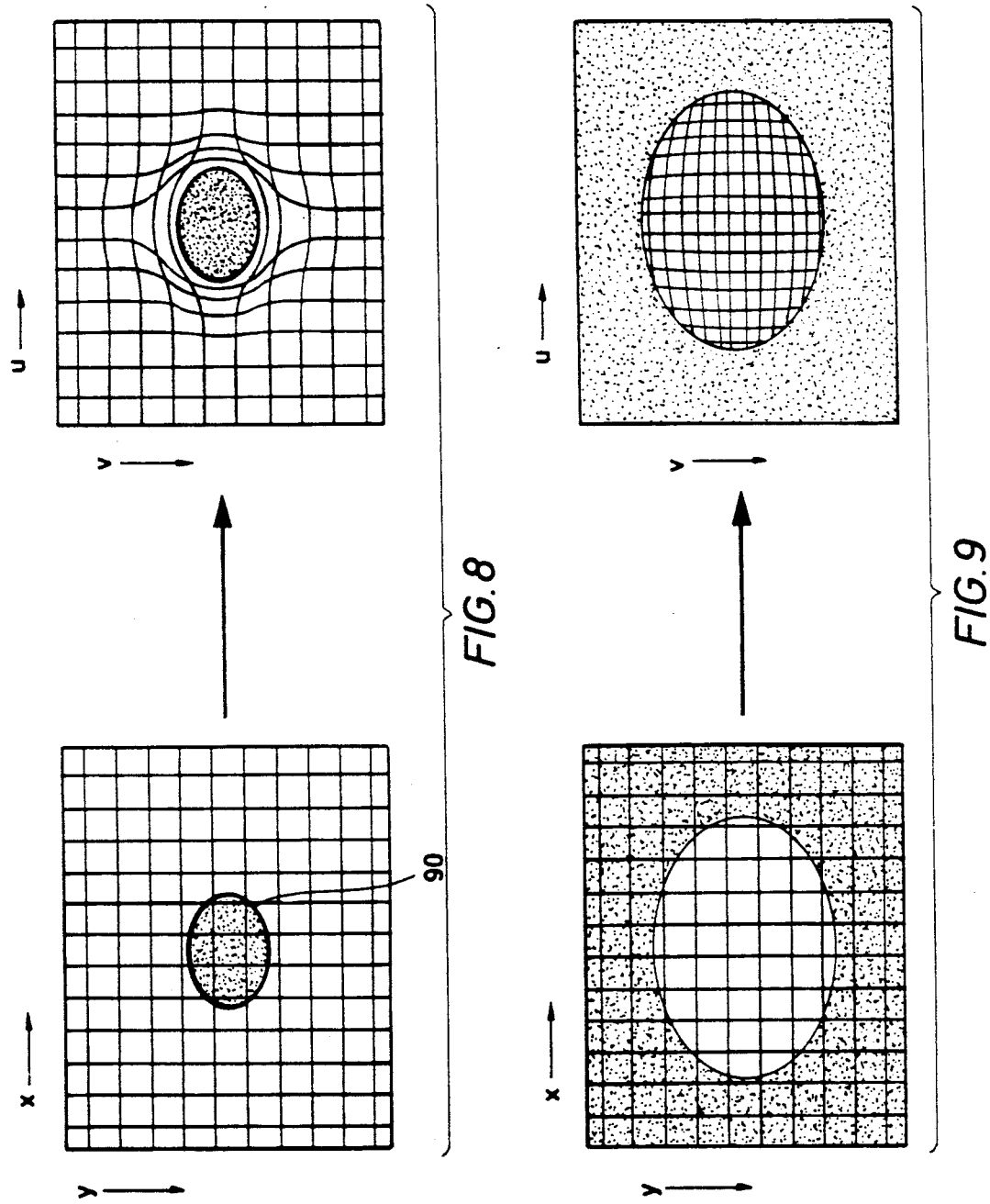

CENTERED

PROGRAMMABLE REMAPPER FOR IMAGE PROCESSING

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

This invention relates in general to image processing systems and methods and in particular to a machine which accepts a real time video image in the form of a matrix of picture elements (hereafter called pixels) and remaps such image according to a selectable one of a plurality of mapping functions to create an output matrix of pixels. Such mapping functions, or transformations may be any one of a number of different transformations depending on the objective of the user of the system. More particularly, the invention relates to a system for the generation of an output pixel matrix according to any one of a number of transformation functions in real time so that the input image may be spatially remapped prior to presenting them to an optical correlator. Still more particularly, the invention relates to mapping functions useful to transform the input video image into an output pixel matrix for display on an image display device as an aid to people with low vision problems such as retinitis pigmentosa and maculopathy.

2. Description of the Prior Art

Optical correlators are used in pattern recognition, attitude estimation systems and the like to process an input image to create an adjusted image for comparison with a standard image. Such optical correlators (particularly phase-only correlators) are excessively sensitive to scale change and rotation of the input image. Much effort must be expended in designing and constructing filters that ameliorate such sensitivity.

Mapping or transforming of an input image to produce rotation and scale invariance in an output image while still in the spatial domain substantially eliminates the rotation and scale sensitivity requirements of a correlator of the transformed image. One such mapping or transformation with properties of rotation and scale invariance is disclosed, for example, in U.S. Pat. No. 4,267,573 to Chaikin and Weiman. The Chaikin and Weiman patent describes an image transformation device, which may be a physical device, or a combination of an A/D converter of a video image followed by a mathematical transformation operating on digital signals, which produces transformed output signals (which may, if desired, be viewed as a video image on a television monitor). The output image of the transformed input signals (i.e., the image of the output signals) is "congruent"; that is, the output image is the same size and shape regardless of changes in size of the input image. The output image is also rotationally invariant, that is, its size and shape is the same regardless of rotation of the input image.

The Chaikin and Weiman patent describes mappings from a digitized input Cartesian grid to a digitized output Cartesian grid. The mapping serves to associate a picture element or cell (herein called a pixel) in the input Cartesian grid through a particular coordinate transformation with the congruent properties described above is $$W = e^Z$$

where Z is the complex number representation $(x + i\,y)$ of the Cartesian coordinates of the input image pixels, and W is the complex number representation of the coordinates of the transformed output image. Geometrically, this mapping or transformation equation is equivalent to providing a Cartesian output matrix of columns and rows where the output rows represent rays or radii centered in the input Cartesian input matrix and the output columns represent rings or circles centered in the input Cartesian input matrix. Each ring radius is determined by $$W = e^x$$

and the angle of each ray or radii is $$\Theta = 2\pi y / y_{max}.$$

The Chaikin and Weiman patent also describes curvilinear logarithmic spiral mapping systems which have the property of rotational and scale invariance, but the output coordinate system is not the convenient Cartesian or square grid as in the ray/ring transformation described above. In one, the output grid is a skewed x-y Cartesian grid where the mapping is formed by two orthogonally intersecting families of logarithmic spirals. In another, the output grid is a lattice of equilateral triangles where the mapping is formed by two families of intersecting non-orthogonal log spirals.

The Chaikin and Weiman patent is an important contribution to the art of image transformation in the field of pattern recognition. It is only one image transformation solution, however, of the universe of such solutions, to the general problem of preparing an output image for presentation to a pattern recognition system so that a priori known input image in-plane motions (the so-called "optical flow" in the time-varying image) become purely translational in the output image. It is a great advantage to discover transformations which produce such property in the output image, because pattern recognition systems are simplified where only translation of the output image is required to match a standard or known image.

Before the invention described below, there has existed no image processor or "remapper" that can operate with sufficient speed and flexibility to permit investigating different transformation patterns in real time. "Real time" is usually considered to be about 30 frames per second with minimum lag. Such an image processor is desirable to investigate an optimal transformation for a given image processing problem. For example, where in-plane rotation and scale invariance are important for one problem, the ray/ring transformation of Chaikin and Weiman described above should be considered. Where Forward Looking Infra Red (FLIR) images are to be transformed or remapped prior to pattern recognition processes, a projective transformation or ratio of affines transformation should be considered. Where an input image should be mapped to an output image such that certain information of the input is displaced and enhanced (e.g., magnified, edge enhanced, etc.) in the output image to benefit people with low vision problems, another transformation should be considered, and so on.

Optical correlators and other pattern recognition methods deal well with translation, but are difficult to design where the output image (i.e., the input image to the correlator) it is working on must be rotated or have its scale changed. The Chaikin and Weiman transformations, such as the ray/ring transformation to a Cartesian output grid, achieve such scale or rotation translation ease, because translation in one Cartesian direction corresponds to a change in scale while translation in the other Cartesian direction corresponds to a change in rotation. But, if the position of the input image must be changed for pattern recognition, optical correlators can not easily be designed to cope with such changes. Accordingly, the image processing art has needed a programmable remapping system to easily and rapidly perform spatial transformation as a front end to an optical correlator.

Identification of Objects of the Invention

Accordingly, it is an object of the invention to provide a system where any one of a plurality of different transformations may be used to transform an input image to an output image.

It is another object of the invention to provide a remapping system by which one or more transformations may be discovered or used to map or transform an input image for presentation in an output image for use by a pattern recognition system so that a priori known in-plane motions or "optical flow" of input time-varying images become translations in the output image.

Another object of the invention is to provide an image remapping system which provides a real time remapped image according to any one of a number of different remapping transformations.

Another object of the invention is to provide a system for remapping an input image into an output image for presentation to visually-impaired people.

Another object of the invention is to provide a remapping system for transforming input pixel information into output pixel information whereby where many input pixels are mapped into a single output pixel with radiance information of such input pixels appropriately weighted and where one input pixel is mapped into many output pixels with radiance information of pixels surrounding such input pixel appropriately interpolated for such output pixels.

SUMMARY

The objects identified above as well as other advantages and features of the invention are provided by the system of the invention for remapping input images from one coordinate system to another using a set of look-up tables for the data necessary for the transform. The transforms, which are operator selectable, are pre-computed and loaded into massive look-up tables. Input pixels, via the look-up tables of any particular transform selected, are mapped into output pixels with the radiance information of the input pixels being appropriately weighted.

The preferred embodiment of the system includes two parallel processors. The first is a collective processor which maps multiple input pixels into a single output pixel. This processor is used where one or more input pixels are compressed into such single output pixel. In other words, the value of each output pixel may be affected by the values of several input pixels. The second is an interpolative processor where a single input pixel affects a plurality of output pixels. The interpolative processor performs an interpolation among pixels in the input image where a given input pixel may affect the value of many output pixels.

Novel remapping transformations are used in the programmable remapper to transform an input image into a warped output image to accommodate for certain defects of visually-impaired people. For the disease of maculopathy, the central vision field of the eye is missing or impaired, and a mapping transformation is defined to provide a hole in the center of the input image with the mapping transformation causing the information in the entire input image to be stretched in the output image about such hole. For the disease of retinitis pigmentosa (tunnel vision) the eye has a loss of peripherial vision A mapping transformation is defined to compress the periphery of the input field to a smaller radius corresponding to that of the remaining viable retina.

The invention further includes apparatus and a method for panning the input data creating the effect that an input image is moved with respect to a transformation pattern. Output panning is also provided.

BRIEF DESCRIPTION OF THE DRAWINGS

The objects, advantages and features of the invention will become more apparent by reference to the drawings which are appended hereto and wherein like numerals indicate like parts and wherein an illustrative embodiment of the invention is presented of which:

FIG. 6 illustrates a many-to-one transformation of input pixels to a single pixel and a one-to-many transformation of a single input pixel to many output pixels;

FIG. 7 illustrates an interpolation method by which the radiance value of single input pixel is interpolated among surrounding input pixels for determining the radiance value of a single output pixel in a one-to-many transformation;

FIG. 8 is an illustration of the results of a transformation from an input image to an output image useful to a person with the eye disease of maculopathy;

FIG. 9 is an illustration of the results of a transformation from an input image to an output image useful to a person with the eve disease of retinitis pigmentosa;

DESCRIPTION OF THE INVENTION

Figure 1:
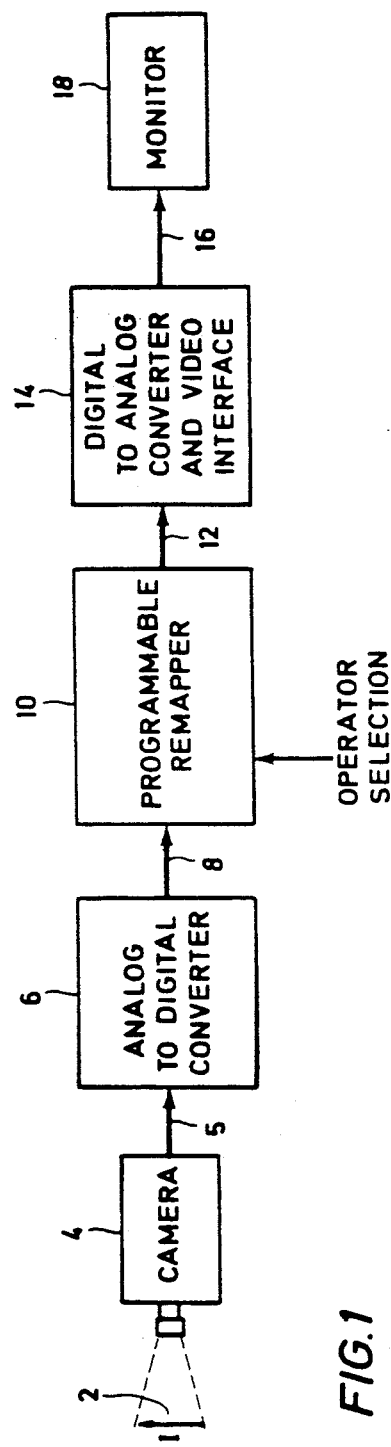
FIG. 1 is a schematic of a video system including a programmable remapper of the invention whereby input images may be transformed according to an operator selectable transform into an output image.

FIG. 1 illustrates the programmable remapper 10 of the invention in the environment of a complete video system including a camera 4 which produces an electronic signal on lead 5 corresponding to image 2. Camera 4 is preferably a conventional video camera, but may be of other technological forms such as an array of charge coupled devices, etc. If the camera 4 produces an analog data stream rather than direct digital values, an analog to Digital converter 6, in a well known manner, accepts the electronic video signal on lead 5 to provide a series or matrix of pixel cell coordinates i.e., location data) and radiance values of image cells or pixels of an x-y Cartesian matrix according to a matrix of I columns and J rows. The address or position in such matrix is designated by its position in such matrix (i,j). The video signal at each address in the matrix has a pixel value or "image state" data such as light intensity value, color, depth, height or other picture cell data. Such pixel values and associated addresses are applied in real time to programmable remapper 10 where one of a plurality of mapping functions stored therein maps or transforms the input pixels and their pixel values into an output (u,v) Cartesian matrix characterized by K columns and L rows. An output image of the remapped input image may be displayed on a monitor 18 via a lead 16 from a conventional digital to analog converter and video interface circuit 14 which receives the output signal on lead 12.

Digital image processing, whether for video display or other use of the processed image, almost always assumes some continuous nature to the geometrical relationship between input and output images. For much digital image processing, the geometry is taken as being unchanged, an extreme case of continuity. Well known examples are histogram equalization, median filtering, and the like.

Some special effects in television image processing employ non-constant relative geometry, although it is ordinarily of low algebraic order. Two examples are (1) creating picture-in-a-picture and (2) causing a video image to appear as if it were projected onto the face of a rotating cube. In such special effects there may be discontinuities, but over most of the image the relative geometry is designed so as to appear continuous.

Although digital image processing ineluctably relates grids to grids, the specification below makes reference to the perceived underlying continuous (and often, differentiable) relationship between coordinates in the input and output images. The digital images being processed are then regarded as sample values drawn from an image presumed to exist on a continuous coordinate system. This perspective allows the exploration of image transforms of arbitrary algebraic order and their realization in real-time video.

Dual Processing

Figure 2:
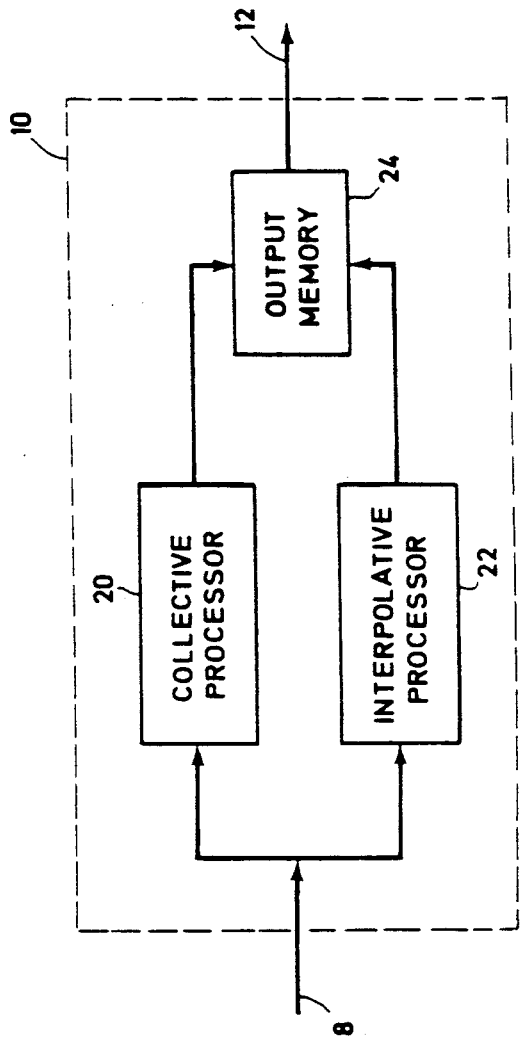
FIG. 2 is a block diagram of the programmable remapper of FIG. 1 showing the two channels of processor of the programmable remapper.

The programmable remapper 10 of the invention, as illustrated in FIG. 2, includes a Collective Processor 20 in parallel with an Interpolative Processor 22. Each processor 20, 22 remaps the pixel elements of the input matrix as applied on lead 8 into a remapped matrix of pixel elements for storage in output memory 24. Output memory 24 is accessed via output lead 12.

As depicted in FIG. 2, the remapper of the invention is divided into two distinct processing flows: the Collective Processor 20 and the Interpolative Processor 22.

Each processor includes a plurality of selectable transforms stored in look-up tables. The look-up tables are ordinarily required to be conjugate in the sense that each output pixel is created by operations in only one of the two Processors. Such look-up tables for the Collective Processor 20 and the Interpolative Processor 22 are determined off-line and stored in memory of the remapper 10 so that certain input pixels are remapped into the output matrix by the Collective Processor while the remaining input pixels are remapped into the output matrix by the Interpolative Processor. Such off-line decision as to whether an input pixel is to be processed in the Collective Processor or the Interpolative Processor is often a function of the determinant of the Jacobian J of each particular remapping function stored in remapper 10. Where input coordinates are (x,y) and (u,v) are output coordinates, differential changes in the input coordinates and output coordinates are related by, $$\begin{bmatrix} du \\ dv \end{bmatrix} = J \begin{bmatrix} dx \\ dy \end{bmatrix} \quad (1)$$

The Collective Processor look up tables remaps input pixels into an output pixel in a many to one manner. In other words several input pixels transform into a single output pixel. Such action takes place at those locations of the input matrix where the Jacobian determinant is less than unity, such as in the periphery of a ray/ring grid remapping function. The Jacobian determinant of a continuous and differentiable two dimensional mapping, associated with the discrete mapping, is defined conventionally as $$det\begin{bmatrix} \frac{d(u,v)}{d(x,v)} \end{bmatrix}$$

where u,v are output coordinates and x,y are input coordinates.

The Interpolative Processor look-up tables are computed off-line for storage in memory f remapper 10 to transform those input pixels of that portion of the input matrix where the Jacobian determinant is greater than unity. Accordingly, such look-up tables transform input pixels in a one to many relationship such as in the center of a ray/ring grid remapping function.

Collective Processor

Figure 3:
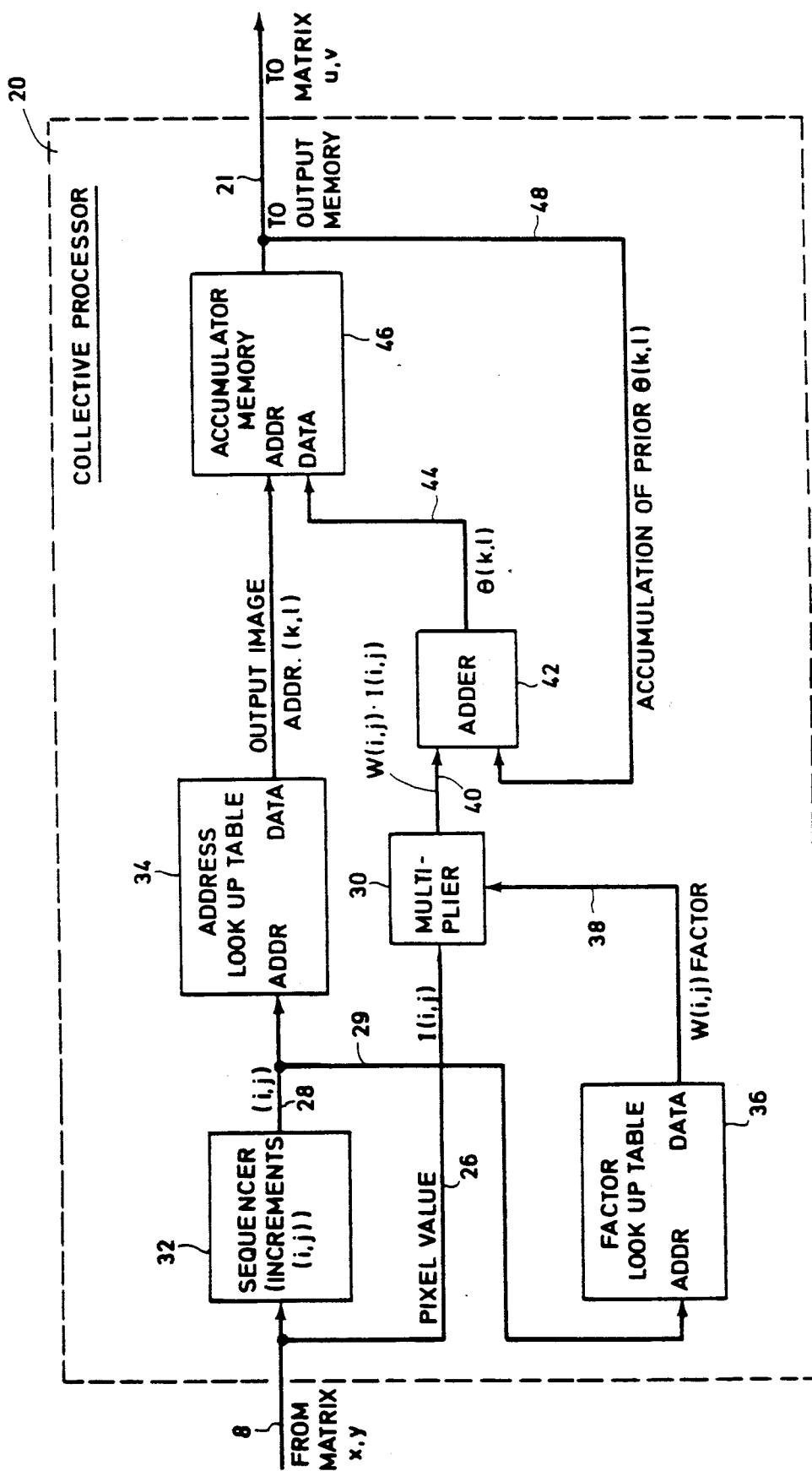
FIG. 3 is a data flow diagram of the Collective Processor of the invention showing the information flow of the many-to-one transformation.

The Collective Processor 20 of FIG. 3 receives video rate data in serial fashion from A/D converter 6 of FIG. 1 via lead 8. Each pixel of the x,y input image matrix includes an input address i,j representative of its position in the x,y input matrix and a "radiance" value I(i,j) representative of its vide characteristic, for example, light intensity. The pixel value I(i,j) is applied to a multiplier 30 via flow lead 26. (The flow diagram of FIG. 3 represents activity within the hardware and software implementation as described below in FIGS. 5A and 5B, but for ease of description, flow leads such as 26, 28 are described here as "flow leads").

A sequencer 32 creates an identifier i,j of the position of a pixel value as it is input to Collective Processor 20. The function of Address Look-up table 34 is to identify the output position k,l of the output matrix of u columns and v rows. Since the collective processor maps more than one input pixel into a single output pixel, if the "radiance" of an output pixel is to match, for example, the average radiance of its pre-image pixels, the "radiance" or pixel value of the plurality of input pixels must be weighted to produce a single radiance or pixel value for the output pixel. Accordingly, the factor look-up table, with the address i,j of the present pixel I(i,j), includes a ore-computed and stored weighting factor w(i,j) which is applied to multiplier 30 via flow lead 38. As a result, the output on lead 40 from multiplier 30 is w(i,j) I(i,j), which is applied to Adder 42. Adder 42 in cooperation with accumulator memory 46 and flow leads 44, 48 serves to accumulate the weighted input pixels into a location k,l in the accumulator memory 46 corresponding to the output matrix location of the mapping. In other words, the Collective Processor multiplies each incoming pixel value by a weighting factor and places it in a new output address k,l according to the equation, $$\Theta(k,l) = \sum_{(i,j) \in Q(k,l)} I(i,j) \cdot w(i,j) \quad (2)$$

where, $\Theta(k,l)$ represents an output image pixel at location (k,l), w(i,j) represents a (signed) sixteen bit weighting factor as a function of the input image coordinates (i,j), I(i,j) represents the incoming pixel value (digitized to eight bits), and (i,j)$\in$Q(k,l) represents that a given output pixel at (k,l) will map to a region (i,j) in the input image determined by the index set Q(k,l).

The weighting factor is preferably a sixteen bit signal, but of course may be of different bit lengths depending upon the precision required. Bit lengths of other signals and table sizes described below may of course vary in length also depending upon the specific design of the remapper according to the invention.

Thus, the input image area is summed in the input image to create the weighted average of the output pixel The input image regions (i,j) are not allowed to overlap. The Collective Processor operates on each pixel as it comes in serially via flow lead 26 and cannot use the same input pixel in two separate index sets.

The output addresses (k,l) for each output pixel are stored in an address look-up table (ALUT) 34. Such table includes 1,048,576 words each of sixteen bits. Each word corresponds to an output address. The sixteen bit width indicates that output addresses for a 256 by 256 output image are possible. The length of the table allows for an input image of up to 1024 by 1024 pixels in size. When the programmable remapper 10 is to be used with an image smaller than this maximum, the Address Look-Up Table 34 (and the Factor Look-Up Table 36) may be segmented to allow several transforms to be loaded at once. (Of course a larger memory may be provided to accommodate a larger input pixel matrix.) Accordingly, up to sixteen different transforms may reside in the memory of remapper 10 of the preferred embodiment, each one available and selectable by user command.

The weighting factors w(i,j) for each input pixel are stored in a Factor Look-Up Table 36 (FLUT) which is also one megaword (1,04B,576) and sixteen bits wide. The weighting factor allows 10 bits of dynamic range for use in normalizing the radiance or light intensity of each pixel. This normalization of each pixel allows as many as 1024 input pixels to be collected into a single output pixel while preserving the average radiance of the input pixels. The remaining six bits of the weighting factor provides a (+or −) shaping factor signal to produce an output pixel free of aliasing. Such bits of the factor look-up table may be arranged in different proportions to compromise the anti-aliasing feature for dynamic range.

Interpolative Processor

Figure 4:
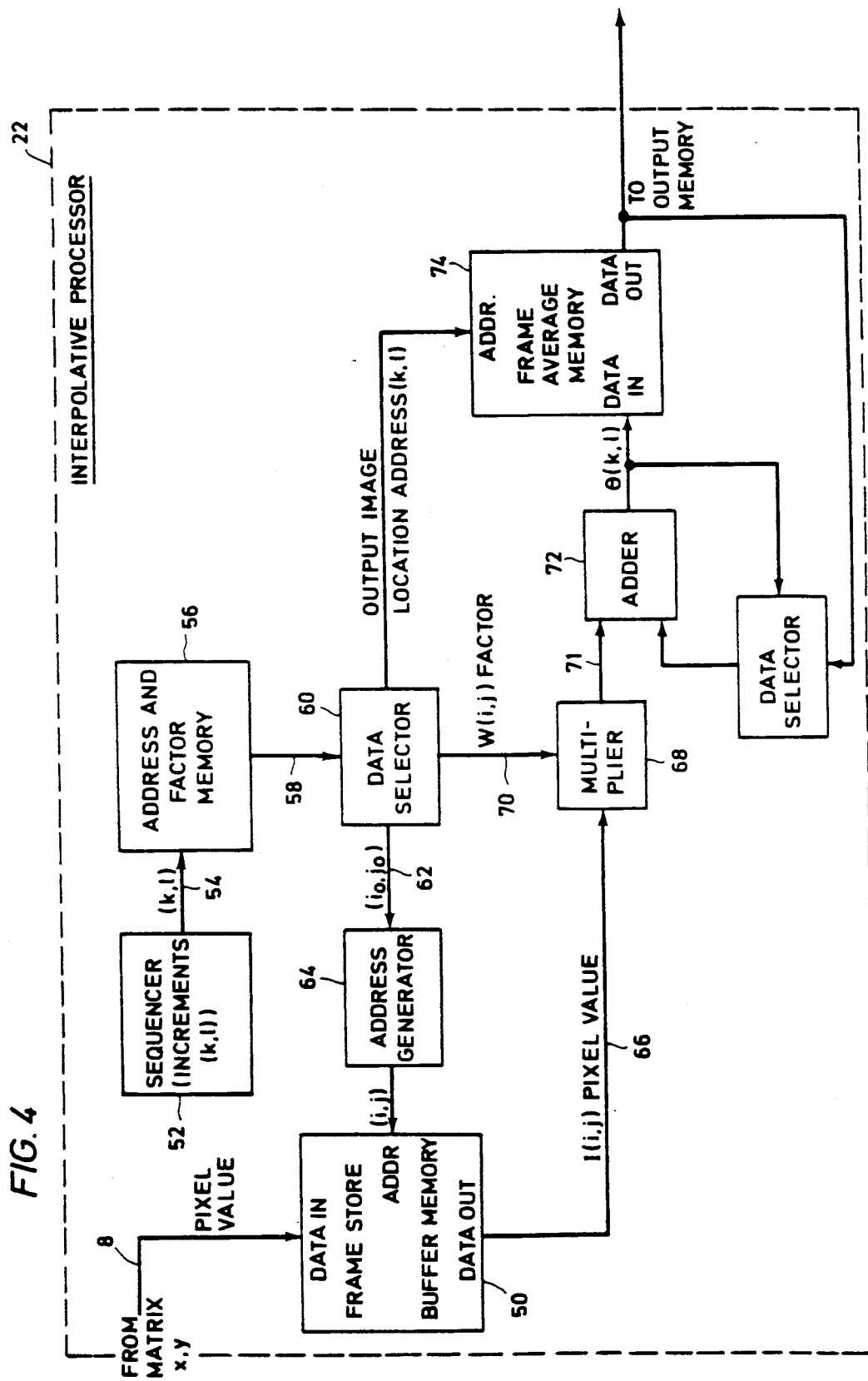
FIG. 4 is a data flow diagram of the Interpolative Processor of the invention showing the information flow of the one-to-many transformations.

The processing flow of Interpolative Processor 22 of FIG. 2 is illustrated in FIG. 4. Its purpose is to create output pixels when an input pixel is to be mapped into more than one output pixel Such a condition exists as illustrated in FIG. 6 where a ray/ring mapping grid overlaps a Cartesian matrix of input pixels. The illustration shows that the input pixel (i=8, j=8) maps (for illustration purposes only) into the output matrix for (k=0, l=0 to k=4, l=10) a total of 40 output pixels.

Consequently, the lnterpolative processor is used according to the invention where the coordinates of the mapping grid are more densely packed than the actual pixels of the image sensor, such as at the center of a ray/ring exponential grid. Under such condition, it is necessary to interpolate among existing input pixels to determine the radiance or pixel value of an output pixel. In effect, an output pixel is selected for which its pixel value is to be determined. Then, a number of "interpolation" input pixels are selected which surround the input pixel that maps into the selected output pixel (as well as others). An interpolation of radiance values is then performed for all of such "interpolation" input pixels to determine the radiance to be assigned to the selected output pixel.

FIG. 7 illustrates the preferred interpolation method for the interpolative processor according to the invention. The input pixel for which interpolation is required is considered to be at the center of a four by four "patch" of input pixels. Such patch is defined by a leading corner address, $i_o$, $j_o$, in the input matrix and includes sixteen pixels surrounding the input pixel to be interpolated. Next, each of the sixteen pixels surrounding the input pixel to be interpolated is assigned a weight, i.e., $w(i_o, j_o)$ . . . . $w(i_{o+3}, j_{o+3})$. Then the input pixel value (radiance) of each of the four by four patch of pixels is multiplied by its assigned weight and summed to determine the interpolated weight, which is then assigned to the particular output pixel being processed. Each output pixel, for which interpolation is necessary is then stored in an output frame buffer.

FIG. 4 illustrates the interpolative processor where pixel values are periodically applied to buffer memory 50 where all the input image pixel values are stored in an input Cartesian coordinate system. Sequencer 52 steps through memory 56 in a predetermined manner. Because the entire output image is not created with the interpolative processor, not every output pixel k,l is selected, but rather, the particular output pixels k,l are selected according to the requirements of a particular stored transform. Sequencer 52 applies such output matrix coordinates to address and factor memory 56 via flow lead 54. For each output pixel location k,l, address and factor memory 56 contains the address of the leading corner input pixel at $i_o$, $j_o$ of the input pixel matrix, and also includes weighting factors $w(i_o,j_o)$ to $w(i_{o+3}, j_{o+3})$ of the four by four array or patch of pixels about the input pixel for which interpolation is necessary.

Such weights, $w(i_o,j_o)$ to $w(i_{0+3},j_{o+3})$, leading corner address $i_o,j_o$ and output pixel matrix address k,l are passed to data selector 60 via flow lead 58. Address generator 64, with the corner address $i_o,j_o$ received from data selector 60 via flow lead 62 generates each address location of the four by four interpolation matrix and in serial fashion applies them to input pixel frame store buffer memory 50. Each pixel value $I(i_o,j_o)$ to $I(i_{o+3},j_{o+3})$ is applied via flow lead 66 to multiplier 68 where each pixel value $I(i,j)$ is multiplied by its assigned weight $w_{i,j}$ applied to multiplier 68 via flow lead 70 from data selector 60.

Next, each of the products of multiplier 68 are applied serially to Adder 72 via flow lead 71 where weighted input pixel of the four by four interpolation is summed with the sum $\Theta(k,l)$ being stored at address k,l of the output matrix frame memory 74.

The interpolative processor starts with a predetermined leading corner of the input pixel patch where the given output pixel reverse maps into the input pixel matrix. The leading corner defines the patch of pixels about the input pixel to be interpolated. Weights for each such pixel are stored in memory in look-up tables 56 and the processor performs the equation, $$\theta(k,l) = \sum_{n=o}^{3} \sum_{m=o}^{3} W(n,m;k,l) \cdot I(i_o(k,l) + n, j_o(k,l) + m)) \quad (3)$$

The Collective and Interpolative processors are designed so that each output pixel originates from one process, or the other process, but not both. Accordingly, the output memory 12 of FIG. 2 is filled with pixel values from one or the other process.

Preferred Hardware Embodiment of the Programmable Remapper

Figure 5A:
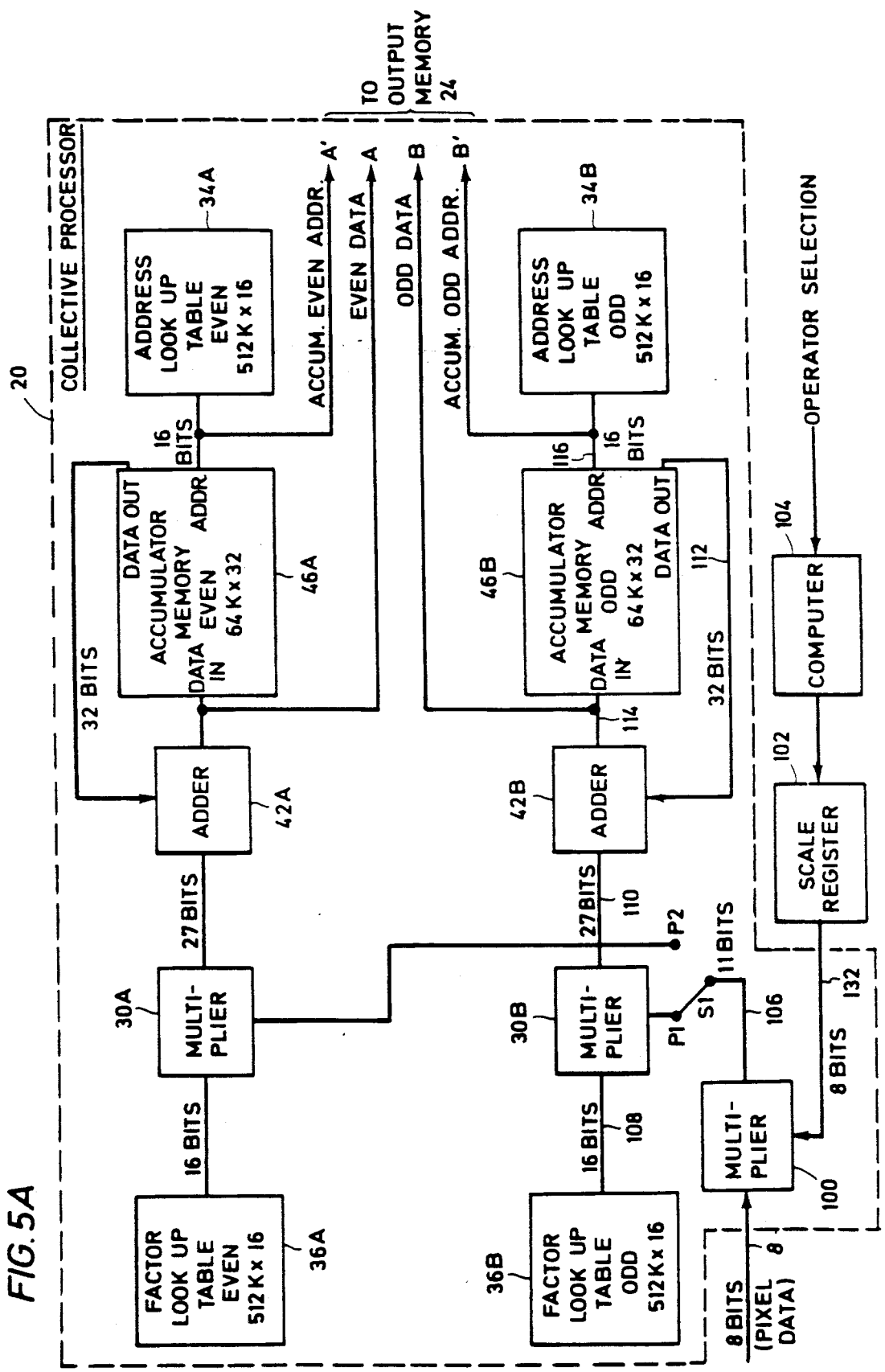
FIGS. 5A and 5B schematically illustrate the hardware implementation of the programmable remapper of FIGS. 2, 3 and 4.
Figure 5B:
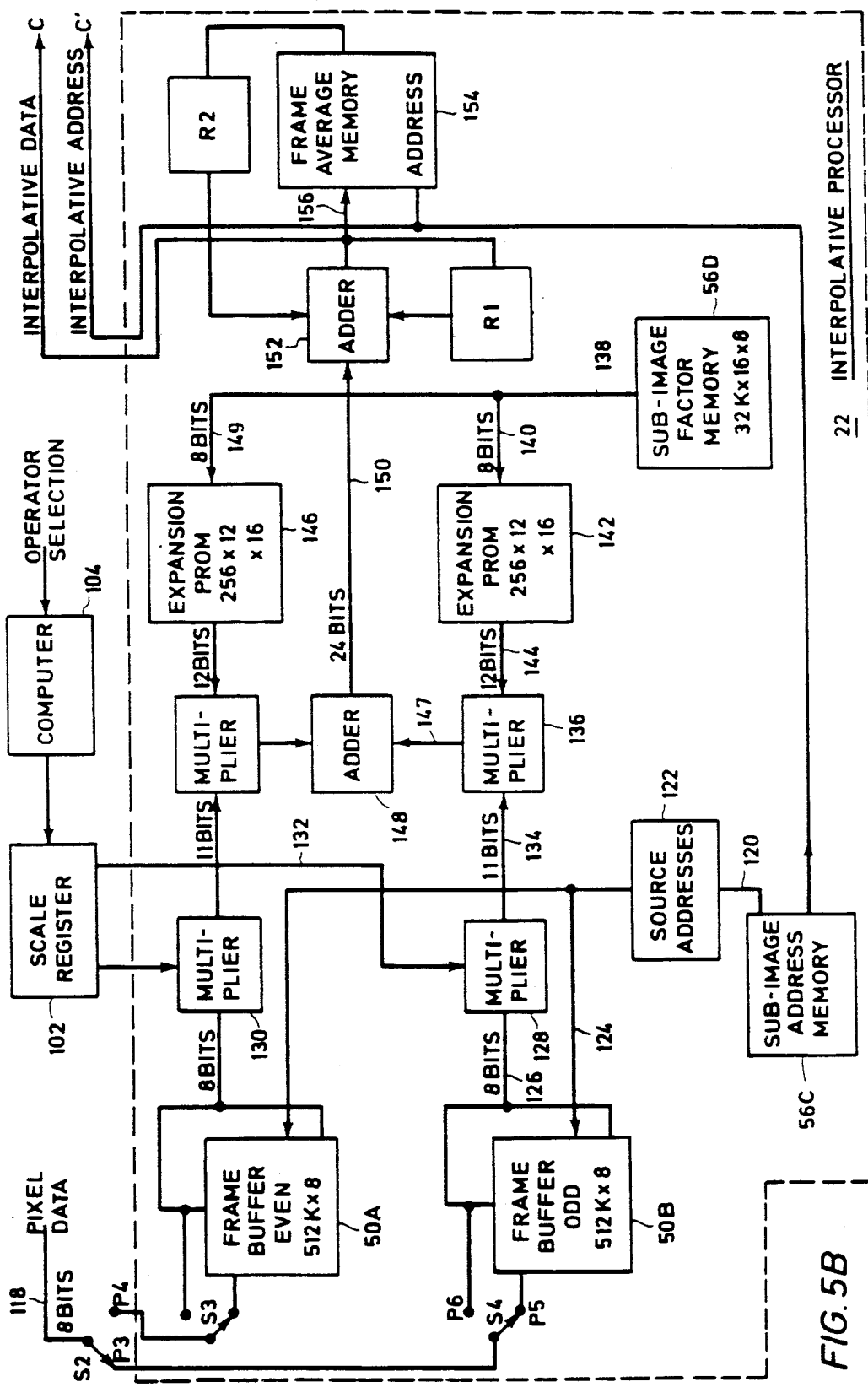

FIG. 5A is a schematic hardware diagram of the Collective processor 20 and FIG. 5B illustrates the Interpolative Processor 22. Each 8 bit pixel value from A/D converter 6 enters on lead 8.

Describing the collective processor 20 first, the pixel value of each pixel is applied to multiplier 100 and multiplied by an 8-bit scale factor stored in register 102. Such scale value is stored in register 102 via controlling microcomputer 104. The result of multiplier 100 is an 11-bit word representing the scaled pixel value which is output on lead 106.

Switch S1 periodically switches between contacts P1 and P2 to separate collective processing into even and odd portions. Such separation allows the collective processor 20 to operate at one half of the speed that would be necessary to process all of the pixels in a single serial flow. By such separation, the clock cycle of the collective processor is reduced from a 10 MHz clock rate to a 5 MHz clock rate.

A description of the odd portion of the collective processor 20 is presented with the understanding that the even portion operates similarly when switch S1 is placed in the P2 position. The 11-bit pixel value via lead 106 and switch S1 is multiplied in multiplier 30B by a 16-bit weighting factor via lead 108 from factor look-up table (FLUT) (odd) 36B. The FLUT is a 512 K × 16 bit memory which sequentially outputs weighting factors—one per input pixel—in synchronism with the arrival of input pixel data on lead 8. The result of multiplication of the scaled pixel value on lead 106 with the weighting factor on lead 108 in multiplier 30B is a weighted pixel value of 27 bits on lead 110 which is applied to Adder 42B.

The other input to Adder 42B arrives via lead 112 from Accumulator Memory 46B. The accumulator memory 46B stores the partial results of the output frame or matrix as it is being created. Such Accumulator Memory is effectively cleared between frames. The 32-bit signal on lead 112 from Accumulator Memory 46B represents any previous results that have been created for the particular output pixel. The address of the output pixel is determined by the contents of Address Look-Up Table (ALUT) 34B.

The ALUT is a 512 K by 16 bit memory which sequentially reads out 16-bit output addresses—one per input pixel. The sum of the 22-bit weighted input pixel value on lead 114 and the 22-bit previous result is stored back into the same location from which the 32-bit signal on lead 112 came. Accordingly, Accumulator Memory 46B ultimately stores the output pixel value equal to the many-to-one portion of the mapping of the input matrix or frame to the output matrix or frame.

In addition to storing the results of the multiplications and "collective additions" of prior input pixels into one output pixel location, the results are continuously applied to output or display memory 24 via leads B and B'. The output pixel value (as currently collected) appears on lead B, while the address of such output pixel appears on lead B'. When the output frame 24 has been completed, that is all the input pixels on lead 8 have been processed, the output frame 24 contains the collected or updated information, obviating the need to transfer the contents of accumulator memory 46B to the output memory 24. At the end of the frame, the Accumulator Memory 46B is cleared, and a new cycle begins. The data on lines B (odd) and A (even) are added together at the output memory 24, and do not necessarily represent sets of output pixel information which are exclusive of each other. In other words, an output pixel of output memory 24 may be filled from collectively processed odd and even pixels.

Turning next to the Interpolative Processor 22 of FIG. 5B, the input pixel value on lead 8 is not immediately scaled, but rather is applied to a Frame Buffer 50A or 50B depending on the instantaneous position of switch S2. The switch S2 performs an identical function to that of switch S1 in Collective Processor 20. It sequentially applies input pixel signals in an odd and even fashion to Frame Buffer Even 50A and Frame Buffer Odd 50B. The odd path in the Interpolative Processor 22 is described by reference to FIG. 5B with the understanding that processing of the even path is identical.

Assuming that a pixel signal value has been applied to switch S2 in the P3 position, the switch position S4 determines which one of two banks of frame buffer memory will be selected for inputting the incoming pixel values. The bank of frame buffer memory not currently being written into is used to process the frame or matrix of input data that was input during the previous frame time. After the entire frame of image data is stored in the odd frame buffer 50B and the even frame buffer 50A, the positions of switches S3 and S4 change with the result that the frame that has been stored is processed while a new frame is simultaneously being input into the others of the hanks of frame buffer memories.

Processing begins by reading out an address out of the Sub-Image Address memory 56C. Such memory 56C, of a size of 32 K long and 64 bits wide, contains two logical data signals for each output pixel to be created: (1) the source address of the upper left corner of the four by four "patch" of input pixels to be used in the interpolation (see FIG. 7), and (2) the destination addresses in the output image where the resulting pixel is to be stored. The source address is applied on lead 120 and applied to address generator 122 which automatically generates the address $i_0, j_0; i_0, j_2; \ldots; i_3, j_3$ of the other 16 input pixels in the four by four patch from which the interpolation value is to be determined. These pixel addresses are applied to frame buffer 50B via lead 124. The odd interpolative pixel value signals are applied via lead 126 to multiplier 128 where they are multiplied by the same scale factor via lead 132 by which the collective pixels on lead 8 are multiplied. It is advantageous to multiply the pixel values in the frame buffer in that only 8 bit pixel values are stored in frame buffer 50B rather than 11 bit values after multiplication. Accordingly, savings in memory is obtained. The 11 bit scaled pixel values (each one of the four by four patch of interpolation pixels) are applied via lead 134 serially to multiplier 136. The interpolation weighting factors, stored in sub-image factor memory 56D are serially applied via leads 138 and 140 to expansion PROM 142 which outputs the corresponding weighting factor to multiplier 136 via lead 144. The PROMs 142, 146 are each of a size of 256 by 16 by 12 bits. The term "256 by 16 by 12 bits" indicates that one of sixteen different 256 location "tables" may be selected, each of which contains 12-bit number signals.

At any one time, 256 memory locations are accessible, each one of which contains a 12-bit factor. The table number is specified by a run-time parameter. The specific factor from the 256 available in Expansion PROM 142 is indexed by Sub-Image Factor Memory 56D via leads 138, 140.

The memory 56D is a Random Access Memory of 32 K by 16 by 8-bits, meaning that there are 32 K logical locations (one for each output pixel) and for each location there are 16 weighting factors for each four-by-four interpolation patch, and each weighting factor is 8-bits wide to access one of the 256 possible entries in the PROM 142. One of these sets of 16 8-bit factors is read out of sub-image factor memory 56D and is applied to PROM 142 via leads 138, 140 for accessing one of the 256 12-bit signals from PROM 142. This 12-bit number is the interpolation factor (one of 16 in the four-by-four interpolation patch) applied to multiplier 136 via lead 144. Thus, a scaled pixel value is multiplied by one of sixteen interpolation weighting factors each of which is sequentially applied via lead 147 to Adder 148. The results of even and odd processing are added together in Adder 148 and applied via lead 150 to Adder 152 which sums the results of the sixteen multiplications necessary to from the interpolated output pixel.

Register R1 holds the partial results while they are being created by even and odd interpolation processors. When all sixteen input image pixels have been processed and the output pixel is complete, the result is written to Frame Average Memory 154 via lead 156 and to output memory 24 via the line labeled C. The interpolative address of the output pixel is applied on line C' from Sub-Image Address Memory 56C.

The frame averaging feature is employed to reduce the amount of noise in the image, as well as to perform special effects. The frame averaging is accomplished differently in the Collective Processor 20 and the Interpolative Processor 22. In the Collective Processor 20, the averaging is accomplished in the Accumulator Memories 46A, 46B. The memories are not cleared after the output frame is completed, but the results of the next frame are simply added on top of the previous frame's data. The results are normalized or divided by the number of frames added, by adjusting the scale factor.

The frame averaging in the Interpolator Processor 22 is accomplished in a similar way, but it is not as straightforward as in the Collective Processor 20. The results of each completed output pixel are written both to the display or output memory 24 through line C and to memory 154 called Frame Average Memory. This Frame Average Memory 154 serves the same function (in the frame average process) as the Accumulator Memories 46A, 46B of the Collective Processor 20. After the first frame is processed, the Frame Average Memory 154 contains a copy of the interpolation contribution to the output display. During the processing of the next frame, the results of the newly created pixel value is added to the previous frame's pixel value for that location using the register R2. This new result is applied both to the output memory 24 via line C and the frame average memory (for averaging yet another frame).

Mapping Functions For Use in the Programmable Remapper of FIG. 1 Adapted For Use By Low Vision Patients In certain "field-defect" human low vision problems, notably retinitis pigmentosa and maculopathy, the viable portion of the retina retains a degree of spatial continuity and the ability to resolve detail. The mapping functions described below distort an input or viewed image in its own plane so as to use such a low vision patient's viable retina to best advantage. The mappings distort in the plane of the image, taking eccentricity and azimuth as polar coordinates. Eccentricity is the angular distance of an object from the eve's center of fixation; azimuth is the clockwise angular rotation from vertical.

Remapping for Maculopathy

In the case of a scotoma, the central field is missing. To compensate, a hole is formed in the center of the input image, and the image is stretched around the scotoma. The local distortion at the edge of the scotoma is dependent on how small the hole is. Both circular and elliptical scotomas are accommodated. A boundary condition in the image stretching is that the edge of the field is left unmoved. Image warping compacts image information into less space than it originally would have occupied.

For the case of a circular scotoma, only the radial coordinate of an input image location is altered in remapping it from input image to output image. Implicitly defining an input image's eccentricity r', by the equations, $$x = r' \cos \theta, \quad y = r' \sin \theta, \tag{4}$$

only r' is altered in moving into the output image.

$$u = r \cos \theta, \quad v = r \sin \theta \tag{5}$$

with r and r' related affinely by $$r' = ar + \beta. \tag{6}$$

The choices of α and β are derived from the values taken for the radius of the scotoma, for the maximum eccentricity, and for the value of the "effective scotoma". The effective scotoma is that part of the input image that does not get mapped into viable retina outside the scotoma. As the size of the effective scotoma is reduced to zero, the local distortion of the image becomes very large. There is a tradeoff to be made, depending on the vision task being performed. For facial recognition, lower local distortion is preferred at the expense of a larger effective scotoma; for text-reading, the balance is in the other direction.

Scotomas usually differ markedly from being circular. Often an ellipse can be a far better fit to a scotoma's actual shape. To that end, a coordinate system is defined that is elliptical at an interior boundary, circular at the outer boundary, and highly smooth in its transition between them. That system is characterized by:
R = the outer boundary's eccentricity
a = the interior ellipse's semi-major axis
b = the interior ellipse's semi-minor axis
and it is parameterized by f and α in equation (7):

$$\begin{bmatrix} u \\ v \end{bmatrix} = \begin{bmatrix} (a + (R - a)f) \cos \alpha \\ (b + (R - b)f) \sin \alpha \end{bmatrix} \quad (7)$$

with $0 \leq f \leq 1$
$0 \leq \alpha \leq 2\pi$

When f is zero, $[x\ y]^T$ traces out the ellipse of semi-major axis a and semi-minor axis b as t sweeps from 0 to $2\pi$. When f is unity, $[x\ y]^T$ traces out the circle of radius R. For $0<f<1$, the curve parameterized by t is an ellipse that smoothly moves from the inner elliptical boundary to the outer circular boundary as f changes from 0 to 1. The generalization to a rotated ellipse is straightforward. With the parameterization of the space between the (elliptical) scotoma and the edge of the peripheral field of view, remapping is performed by changing f in a manner similar to the way r was changed for the circular scotoma. The parameter g is defined with the ratio ($0 \leq g < 1$) by which the elliptical scotoma is to be multiplied to obtain the reduced scotoma. The outer boundary is to be retained as a circle of radius R.

The processing begins with determining the parameters f and α in the output image. The parameters f, α and g are used to calculate x and y in the input image, and then bring that input image's pixel value into the output image. The parameter f must be determined. For even this simple elliptical extension of a circular scotoma a fourth-degree polynomial must be solved for f:

$$f^4[(R-a)^2(R-b)^2] + f^3(-2a(R-a)((R-b)^2 - \quad (8)$$
$$2b(R-a)^2(R-b)] + f^2(-a^2(R-b)^2 - 4ab(R-a)(R-b) -$$
$$b^2(R-a)^2 + v^2(R-a)^2 + u^2(R-b)^2 +$$
$$f[-2ab^2(R-a) - 2a^2b(R-b) + 2v^2a(R-a) +$$
$$2u^2b(R-b)] + [-a^2b^2 + v^2a^2 + u^2b^2] = 0$$

Equation (8) follows the elimination of from equation (7). (Elimination of f results in a transcendental equation for α rather than the algebraic equation [8]). Operationally, two observations can be made; first, equation (8) is solved off-line to determine the tables that drive the Remapper 10 as described above. Second, Newton's method is very efficient as an input image is processed, because the successive values of f are closely related for neighboring pixels. A good first guess at f is the value calculated for the adjacent pixel. If f is greater than unity or less than zero for $[u\ v]^T$, that output pixel falls inside the scotoma or outside the periphery and no input pixel is brought to that location. Once f is known for a point $[u\ v]^T$, α is obtained from $$\alpha = \mathrm{atan2}\left(\frac{v}{b + (R-b)f}, \frac{u}{a + (R-a)f}\right) \quad (9)$$

where atan2(·) is the function that returns Θ in the whole range $0 \leq \Theta < 2\pi$ from atan2(sin Θ, cos Θ). A value for g has been assumed and f calculated. The input pixel whose value to place at $[u\ v]^T$ is the one at $$\begin{bmatrix} x \\ y \end{bmatrix} = \begin{bmatrix} [ag + (R - ag)h] \cos \beta \\ [bg + (R - bg)h] \sin \beta \end{bmatrix}$$

Where h = h(f,α) and β = β(f,α) must be determined. This similar parameterization with h and β in the input image allows simple and natural associations to be drawn. Setting h = f and β = α is the simplest. Constraints on the $[x,y]^T$ to $[u,v]^T$ mapping, such as conformality or the preservation of relative arc length along each ellipse as it maps to its associated ellipse in the other image, become differential or integral equations to be solved for $[h\ \beta]^T \rightarrow [f\ \alpha]^T$.

FIG. 8 illustrates a remapping from the x,y coordinates of an input matrix to a u,v output matrix where the x,v coordinates are "warped" or stretched by the transformation described above about a hole 90 in the input matrix, and with the simple relationships h = f and α = β.

Remapping for Retinitis Pigmentosa

In retinitis pigmentosa (RP) the visual field defect is loss of peripheral vision. By remapping, it is possible to squeeze the periphery of the normal field to a lower eccentricity—that of the remaining viable retina. By having a stronger radial demagnification at the periphery than at the center, it is possible to present the entirety of the normal field within the smaller viable retina, and yet retain full world-referenced acuity at the center. In a similar manner to the remapping of an elliptical scotoma, the formalism for tunnel vision permits mapping into an elliptically shaped viable retina.

The conventional approach to RP prostheses is a telescope of uniform magnification (less than unity) at all eccentricities. With the Programmable Remapper described above, it is necessary to specify radially non-uniform magnification. The effect is familiar as in "fish-eye" lenses. The parameters of a candidate lens can be changed and its clinical efficacy studied before cutting glass for it. As in the maculopathy remappings discussed above, pixels are moved along radial lines, initially without regard to conformality. As before, r is the eccentricity in the display and r' is the eccentricity in the world. For the case of a circular viable retina, a is defined as the peripheral eccentricity in the display and b is defined as the peripheral eccentricity in the world that is to be mapped into the peripheral eccentricity in the display. That is, r is to vary between 0 and a, and r' is to vary between 0 and b. The constraint that central magnification is to be unity is that derivative of r with respect r' at zero is one. The following function is one such that meets those constraints that also (1) is differentiable in all orders, and (2) parametrically determines the rate of change of local eccentricity magnification. The parametric function is $$f = r\left[1 + \frac{r^{p-1}(b-a)}{a^p}\right] \quad (12)$$

As parameter p varies, the eccentricity transformation changes character. For p=1 it is a strictly constant minification (by the factor b/a). For intermediate values (for example, 2) there is a central zone with unit" magnification. As p grows arbitrarily large, the central zone of unity magnification expands, and in the limit the effect is as of no remapping at all. I.e., one is back to looking through the tunnel again, for large values of p.

FIG. 9 illustrates the remapping of an input image or x-y coordinates to an output image of u,v coordinates where the entire input image is included within an area corresponding to the usable vision area of the patient.

Programmable Remapper Panning

An important advantage and feature of the programmable remapper 10 of the invention is its capability to effect "panning" of images. There are two types of pans which can be achieved with the preferred hardware described below by reference to FIGS. 5C and 5D.

Input Image Panning

The first kind of pan which may be selected by an operator is called an input image pan, which produces an output image similar to moving the camera about and pointing it at different locations. It is important to understand, however, that the camera 4 of FIG. 1 does not move. Input image panning herein is defined to mean that existing data is merely moved about to create the effect of an output image as if the camera were moved around.

Output Image Panning

The second type of pan is called the display pan where the output display matrix is "wrapped" or scrolled from one edge to another. In other words the output image data that scrolls off the right edge of the screen appears on the left edge, and similarly, the data that scrolls over the top edge scrolls over to the bottom edge.

Hardware Implementation of Input Image Panning

Figure 10A:
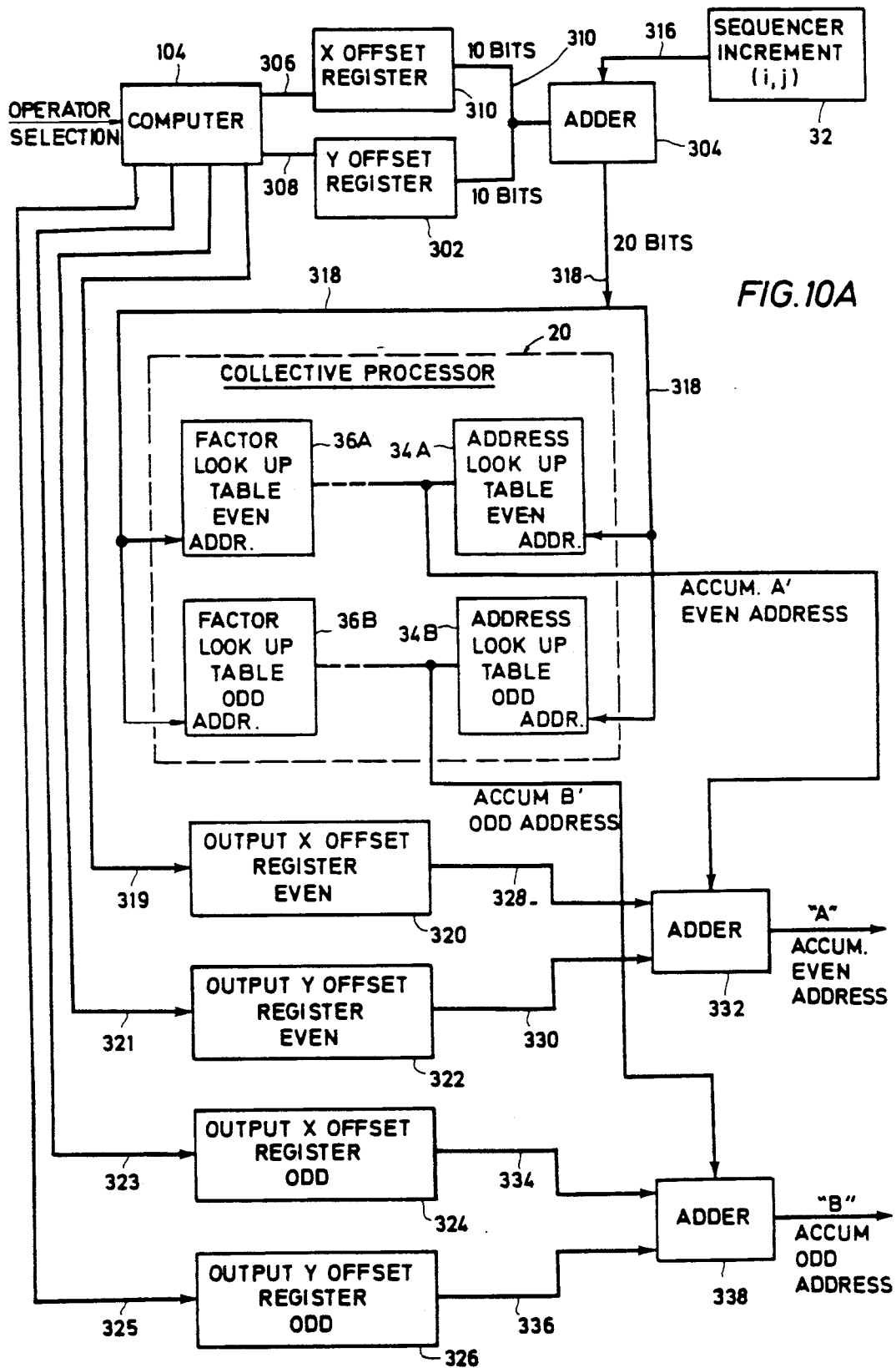
FIGS. 10A and 10B illustrate hardware provided with that shown in FIGS 5A and 5B so that input and output panning of the images may be achieved.
Figure 10B:
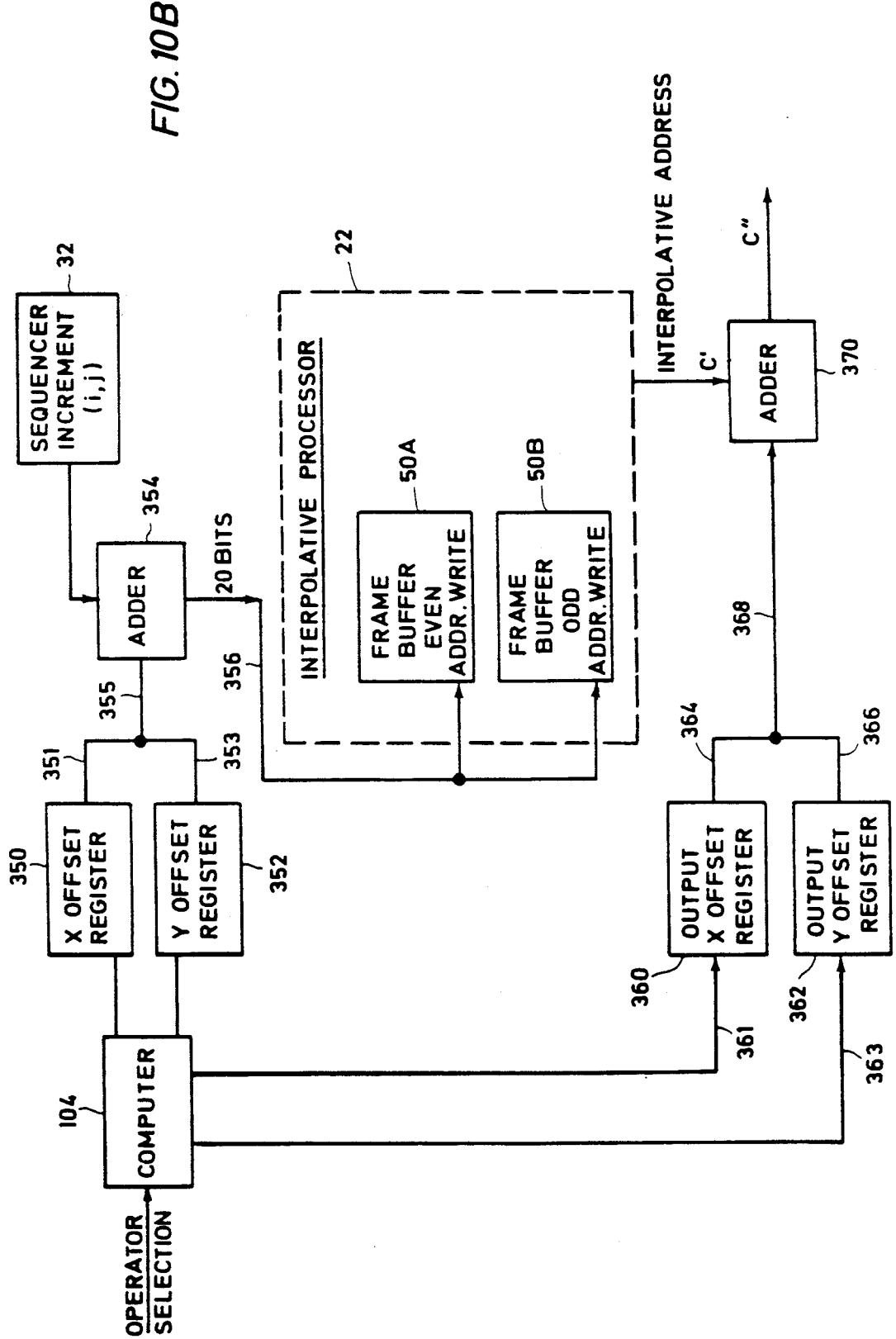

The hardware required for input image panning for the collective processor 20 is illustrated in FIG. 10A and for the interpolative processor 22 in FIG. 10B. Referring first to FIG. 10A, the input pan is accomplished by setting appropriate pan values into x and y offset registers 300, 307 from computer 104 via leads 306, 308. The outputs of registers 300, 302 are 10-bit signals which appear on flow leads 310, 312 and represent horizontal and vertical pan values or "shifts" respectively. The signals on flow leads 310, 312 are logically combined on flow lead 314 to form a 20-bit signal which is applied to adder 304. A sequencer 32 indexes through the input matrix of the input image and applies its indexing signal to adder 304 via lead 316. The results of the adder appears on flow lead 318, which results are applied to Factor Look-Up Tables 36A, 36B and Address Look-Up Tables 34A, 34B. Accordingly, the registers 300, 302 effectively apply an offset into the look-up tables for any particular transformation stored therein causing different factors to be read out for different input image pixels. Such offset is operator selectable via computer 104 by means of ordinary input devices such as a keyboard, joy stick, and the like. The input pixels are consequently mapped to new locations in the output by virtue of differing contents of the address look-up tables 34A and 34B.

The implementation of input imaging panning in the interpolative processor 22 is illustrated in FIG. 10B. It uses similar hardware, e.g. computer 104, x offset register 350, v offset register 352, adder 354 and sequencer 32 to produce an offset signal on flow lead 356 which is applied as an offset location to the address write inputs of Frame Buffer Even 50A and Frame Buffer Odd 50B. During operation of the interpolative processor 22, pixels are fetched from Frame Buffers 50A and 50B as described above, but with offset signals applied via flow lead 356, the contents of such Frame Buffers are changed due to the offset address when loading pixels. The x offset value on flow lead 351 is logically added to the y output of flow lead 353 to form a combined offset signal on flow lead 355. Such combined offset signal is added to the output of input image matrix sequencer 32 to provide the offset memory address to the frame buffers 50A and 50B via flow lead 356.

Hardware Implementation of Output Image Panning

Output display panning may be accomplished either by offsetting the data before it is written into the display memory (as illustrated in FIGS. 10A and 10B) or by offsetting the addresses into the display memory when its contents are displayed. As illustrated in FIG. 10A, x and v output pan values are applied respectively to even registers 320, 322 via flow leads 319, 321 and to odd registers 324, 326 via flow leads 323, 325. The outputs of even offset registers 320, 322 are applied to adder 332 via flow leads 328, 330. The outputs of odd offset registers 324, 326 are applied to adder 338 via flow leads 334, 336. Even offset values are added in adder 332 to the Accumulator Even Address on flow lead A' to form a shifted Accumulator Even Address on flow lead A". Odd offset values are added in adder 338 to the Accumulator Odd Address on flow lead B' to form a shifted Accumulator Odd Address on lead B".

Similar hardware is provided as illustrated in FIG. 10B for the Interpolative Processor 22. Panning output pan values are applied on flow leads 361, 363 to output x and v offset registers 360, 362. Outputs from such offset registers are applied via flow leads 364, 366 and logically added via flow lead 368 to Adder 370. The interpolative address on flow lead C' is added to the output panning value on flow lead 368 to produce a panned output interpolative address on flow lead C". These offset addresses on flow leads A", B" and C" are applied to display or output memory 24 (see FIG. 2) and are written to "wrap around" the information in the output memory so that no data is actually lost.

Method of Using Input Image Panning in Combination With Output Image Panning A third type of panning results from using input image panning in combination with output image panning. Such third type of panning is equivalent to holding the input image position constant while the transformation is moved about within the input image.

Referring again to the low vision transformation illustrated in FIG. 8, if the scotoma 90 is in the center of the screen, yet the target on which the center of the scotoma is to be displayed is in the upper right hand corner of the output image, then the third type of panning allows the scotoma 90 and associated warping to be moved to the upper right hand portion of the output screen and the new image information warped such that the target is warped about the translated scotoma. This third type of panning is different from simple input image panning where the target in the upper right of the screen is "pulled" down toward the center of the screen to become warped while the scotoma itself remains stationary in the center of the screen.

The third type of panning or "combination" panning is accomplished as a two step process. First, the input image is panned and the desired target is pulled to the center of the screen to be warped. Next, the output image or display is panned so that the scotoma, or center of the transform, is moved back up to be centered on the output position where the target was initially.

Advantages of input image panning in Pattern Recognition Systems

The input image panning feature described above provides a high speed, high resolution pan-tilt function that is operator controllable. Such feature may be used as a high resolution vernier pan that operates in conjunction with a slower, coarse pan-tilt mechanism, or it can operate as the sole source of pan-tilt.

Figure 11A:
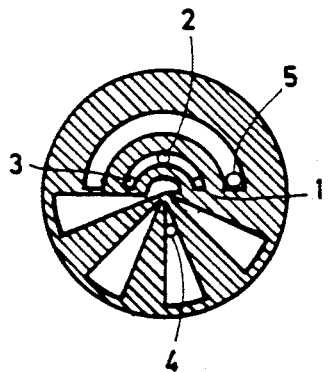
FIGS. 11A–11G illustrate the use of input scanning with a ring-ring transformation so that the transformation may be centered on the input image thereby preserving the scale and rotation invariance features of the transformed output image.
Figure 11B:
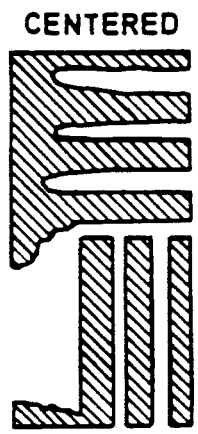
Figure 11G:
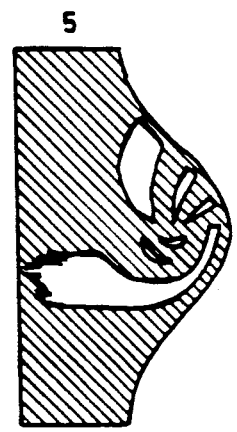
Figure 11C:
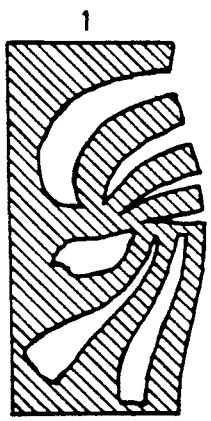
Figure 11D:
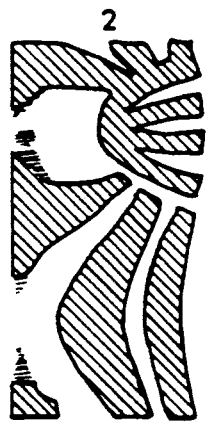
Figure 11E:
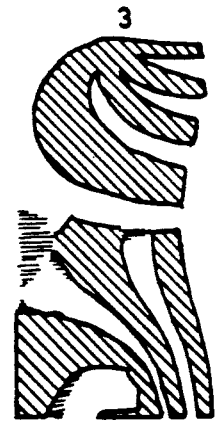
Figure 11F:
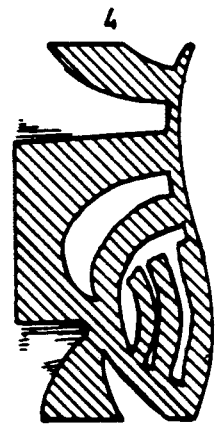

The need for such high speed, high resolution panning results from the fact that many of the desired transformations for pattern recognition (such as the Weiman-Chaikin ray-ring transform) are very sensitive to translations of the object with respect to the position of the transform with respect to the object. If the transform cannot be centered properly on the objects in the image to be transformed (see for example the ray-ring transform of FIG. 6 with respect to an input image grid), then shift invariance is lost. FIG. 11A shows an input image including rings and rays. When the Weiman-Chaikin transformation is centered over the input image, the rings of the input image are transformed to horizontal bars on the output image of FIG. 11A and the ray patterns are transformed to vertical bars of the output image. FIGS. 11C through 11G illustrate the effect of lack of centering of the transformation of the pattern. Accordingly, input image panning may be used to produce an output image like that of FIG. 11B from an input image like FIG. 11A to insure that the transformation matrix is properly centered such that advantageous features of rotational and scale invariance are maintained for pattern recognition of the output image for comparison with a standard.

Various modifications and alterations in the described structures will be apparent to those skilled in the art of the foregoing description which does not depart from the spirit of the invention. For this reason, these changes are desired to be included in the appended claims. The claims which follow recite the only limitations to the present invention and the descriptive manner which is employed for setting forth the embodiments and is to be interpreted as illustrative and not limitative.

What is claimed is:

1. An image processing system comprising
   means for converting an image into a plurality of representative input pixels, said input pixels arranged in a first Cartesian matrix of i columns and j rows, each input pixel including a pixel value,
   an output memory for storing representations of output pixels arranged in a second Cartesian matrix of k columns and n rows,
   storage means for storing a plurality of look-up table sets, each look-up table set representative of a separate transformation of said input pixels into said output pixels,
   processor means adapted to employ one of said look-up table sets for transforming said input pixel values into said output pixels, wherein said processor means includes,
   a collective processor means for transforming the input pixel values of a first set of input pixels into a corresponding first set of output pixels, said first set of input pixels characterized by the condition that the pixel values of more than one input pixel are transformed to affect one output pixel, and
   an interpolative processor means for transforming the input pixel values of a second set of input pixels into a corresponding second set of output pixels, said second set of input pixels characterized by the condition that the pixel value of one input pixel affects the value of more than one output pixel, and
   means for selecting one of said plurality of look-up tables sets for use by said processor means.

2. The system of claim 1 wherein
   said collective processor means employs a first sub-set of look-up tables of a selected one of said plurality of look-up table sets, and
   said interpolative processor means employs a second sub-set of look-up tables for said selected one of said plurality of look-up table sets.

3. The system of claim 2 wherein
   said second sub-set of look-up tables for one of said plurality of look-up table sets includes addresses and corresponding weighting factors for interpolating each input pixel to be transformed by said interpolative processor means into an output pixel, where such addresses define a patch of input pixels about said input pixel, and
   said system further comprising means for determining a plurality of numerical products by multiplying the radiance value of each of said patch of input pixels by said corresponding weighting factor and adding said products to determine the radiance value of said output pixel.

4. The system of claim 1 wherein
   one of said look-up table sets includes transformation means for transforming an input image, a portion of which is masked by a scotoma area, to an output image such that said input image is warped about a corresponding area on said output image.

5. The system of claim 1 wherein
   one of said look-up table sets includes transformation means for transforming an input image, a portion of which is masked by a peripheral area, to an output image such that said input image is warped into an area inside a corresponding peripheral area on said output image.

6. The system of claim 1 further comprising means for shifting said input pixels under operator selection so as to shift said image with respect to said transformations.

7. The system of claim 1 further comprising means for scrolling said output matrix between side edges and between top and bottom edges.

8. The system of claim 1 wherein the collective processor comprises means for input image panning.

9. The system of claim 1 wherein the interpolative processor comprises means for output image panning.

10. The system of claim 1 wherein the interpolative processor comprises means for input image panning.

11. The system of claim 1 wherein the interpolative processor comprises means for output image panning.

12. The system of claim 1 wherein the collective processor comprises means for input image panning in combination with output image panning.

13. The system of claim 1 wherein the interpolative processor comprises means for input image panning in combination with output image panning.

14. A processing system for receiving a plurality of input pixels and transforming them into a corresponding set of output pixels, each input pixel having a pixel value, comprising, storage means for storing a plurality of look-up table sets, each look-up table set representative of a separate transformation of said input pixels into said output pixels, processing means adapted to employ said look-up table sets for transforming said input pixel values into said output pixels, wherein said processor means includes interpolative processor means for transforming the input pixel values of a set of input pixels into a corresponding set of output pixels, said set of input pixels characterized by the condition that the pixel value of one input pixel affects the value of more than one output pixel, collective processor means for transforming the input pixel values of another set of input pixels into another corresponding set of output pixels, said another set of input pixels characterized by the condition that the pixel values of more than one input pixels are transformed to affect one output pixel, and means for selecting from said plurality of look-up table sets for use by said processor means.

15. The system of claim 14 wherein the processing system is an image processing system further comprising means for converting an image into a plurality of representative input pixels, said input pixels arranged in a first Cartesian matrix of i columns and j rows and further comprising an output memory for storing representations of output pixels arranged in a second Cartesian matrix of k columns and n rows.

16. The system of claim 14 wherein the interpolative processor comprises means for input image panning in combination with output image panning.

* * * * *